Sept. 22, 1942.   F. H. MUELLER ET AL   2,296,649
LUBRICATED VALVE STRUCTURE
Filed Sept. 12, 1940

Inventor
Frank H. Mueller.
Walter J. Bowan.
By Cushman Darby Cushman
Attorneys

/ Patented Sept. 22, 1942

2,296,649

UNITED STATES PATENT OFFICE 2,296,649

LUBRICATED VALVE STRUCTURE

Frank H. Mueller and Walter J. Bowan, Decatur, Ill., assignors to Mueller Co., Decatur, Ill., a corporation of Illinois Application September 12, 1940, Serial No. 356,530

2 Claims. (Cl. 251—93)

The present invention relates to lubricated valve structures.

A primary object of the invention consists in providing a rotary valve plug with means for controlling the flow of the lubricant to the seating surface of the valve and also to provide a valve structure including a plug or valve element which can readily be released from a seized position.

Other objects and advantages of the invention will be apparent from the following description when taken in conjunction with the accompanying claims and drawing.

Referring to the drawing, in which is shown a preferred embodiment of the invention:

Figure 1:
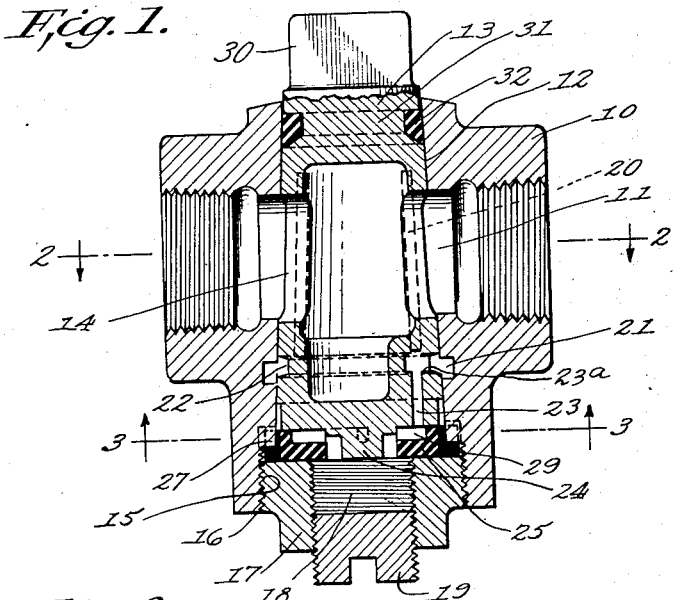
Figure 1 is a vertical sectional view of our improved valve structure.

Referring to the drawing, in which like numerals indicate like parts in the several views, 10 designates the casing or valve body element which has a radially extending passage 11 for flow of line fluid. Extending axially of the body element and transversely of passage 11 is a tapered seat 12. The wall of the seat 12 constitutes one of the seating surfaces of the valve structure and has rotatably mounted therein a tapered valve plug or valve element 13 which has a flow port 14 that registers with the passage 11 when the plug valve is in its open position (Figure 1).

The wall of plug 13 comprises the other seating surface of the valve structure.

Figure 2:
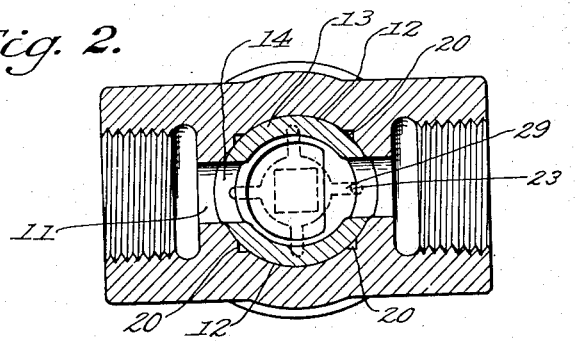
Figure 2 is a sectional view taken substantially along the line 2—2 of Figure 1.

The casing 10 has a depending tubular portion forming a recess 15 which receives the larger end of the plug 13 and is internally threaded as at 16 for receiving a closure or thrust nut 17 which, in turn, has a central threaded bore or chamber 18 arranged to be closed by a plug 19. The inner portion of bore or chamber 18 constitutes a reservoir for receiving lubricant or grease which is to be supplied to the seating surfaces of the valve structure 12 to insure smooth and easy operation and assist in maintaining a tight seal. The seat 12 of casing 10 has a plurality of longitudinally extending grooves 20 which are of less length than the axial length of the valve seat or seating surface 12, and which communicate at their lower ends with an annular groove 21. As shown, four longitudinal grooves 20 of equal length are provided and are preferably spaced 90° apart so that two grooves are located on each of the portions of the seat 12 separated by the flow passage 11 (Figure 2).

Figure 3:
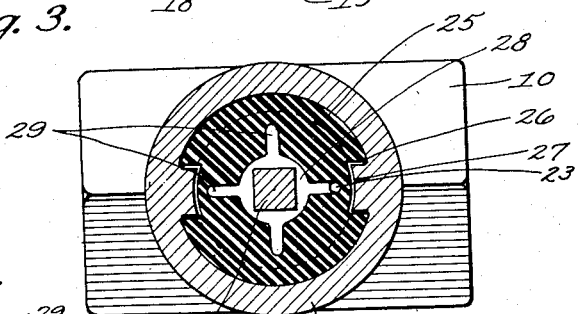
Figure 3 is a sectional view taken substantially along the line 3—3 of Figure 1.

The larger end of the plug 13 has an annular groove 22 substantially opposite the groove 21 in the casing, and also is provided with a port 23 which extends axially to one end thereof. The inner end of port 23 opens to a short radially extending passage 23a opening to the annular groove 22. The larger end of the plug 13 terminates in a centrally disposed reduced lug 24. A combined control member and washer 25 formed of rubber or other resilient material, is positioned within the tubular portion 15 of the casing in contact with the retaining or thrust nut 17. The member 25 has opposed recesses 26 which closely fit complementary lugs 27 formed in the inner wall of the tubular portion 15 of the casing so as to maintain the control member fixed against rotation and also seal recess 15 from the seating surfaces of the valve structure. It is to be noted that the relatively loose fit of the washer 25 with respect to the lugs 27 indicated in Figure 3 is merely for clarity. The member 25 also has a central circular opening 28, and a plurality of radial slots 29 which communicate with the opening 28 and terminate short of the outer peripheral edge of the washer (Figure 3). Preferably four radial slots 29 are provided which are equally spaced apart. However, the number may be varied if desired.

The lug 24 on the valve plug 13 extends into the opening 28 of member 25 but is spaced from the walls of opening 28 to allow the lubricant in the chamber 18 to be forced upwardly into the radial slots upon the tightening up of the plug 19. The valve plug 13, when moved to either its fully closed position or its fully opened position, is rotated substantially 90°. Consequently, since one of the radial slots 29 is arranged to register axially with port 23 when the plug is in either its closed or open position, it will be seen that pressure from chamber 18 will only act upon the lubricant in the grooves 20 when the valve plug 13 is either completely closed or completely opened, and that the pressure is cut off when the plug 13 is in any intermediate position.

The smaller or upper end of the plug 13 extends beyond the casing and is provided with a non-circular head 30 arranged to receive a suitable tool for the purpose of turning the plug to control the flow of the line fluid through the casing. The upper portion of the plug 13 within the valve seat 12 may be provided with an annular channel 31 for receiving a packing 32 of any suitable material such as rubber or the like.

The adjustable thrust nut 17 bears against the under side of the washer member 25 so as to force the latter against the larger end of the valve plug 13 in order to maintain the plug in proper position against its seat 12. Additionally, the pressure of the lubricant in the chamber 18 coacts with the nut 17 to insure the valve plug 13 being held in proper position within the casing 10. The locking engagement of the lugs 27 with the washer member 25 prevents the latter from being turned by the rotation of the valve plug 13 and insures the radial slots being maintained in a fixed position so as to register singly and sequentially with the axial port 23 in the plug when the latter is rotated in an arc of 90° in either a clockwise or counter-clockwise direction.

It will be noted that the longitudinal grooves 14 in the plug terminate short of the channel 31. However, if desired, these grooves could be extended into the channel 31 to supply lubricant thereto and thus dispense with the use of the packing 32. The groove 21 in the casing 10, is preferably vertically offset relative to the groove 22 in the plug so that during the operation of the valve, the tendency of the plug to grind or form a shoulder in the body is eliminated.

It will be seen that when the parts are assembled and the chamber 18 is packed with a suitable viscous lubricant, the valve plug 13 may be moved to its open position as shown in Figure 1 by any suitable tool applied to the head 30. When in this position, one of the slots 29 registers with the port 23 so that the lubricant which is forced from the chamber 18 upwardly into radial slots 29, passes through one of these slots into the port 23, thence around the groove 22 into the groove 21 where it is conducted upwardly by the grooves 20 so as to lubricate the seating surfaces of the valve structure and thus insure a smooth and easy operation. When the plug 13 is turned toward closed position, the port 23 is moved out of registration with its previously aligned slot 29 so as to cut off the flow of the lubricant until the plug reaches its fully closed position, at which point the port 23 registers with one of the other of the radial slots 29 so as to allow the lubricant to be forced upwardly to the valve seat. Thus the opening 23 in the valve plug 13 is arranged to communicate with one of the four radial slots 29 in the stationary member or washer 25 when the plug is in either fully opened or fully closed position to permit pressure to act upon the lubricant in the seating surfaces, but such pressure is cut off when the plug is in any intermediate position. In other words, the seating surfaces are effectively closed from pressure in the chamber 18 until the plug is moved to either its fully closed or fully opened position. The lubricant within the chamber 18 is maintained under proper pressure by the plug 19 which has a kerf opening 33 for receiving a suitable tool for adjusting the plug or for removing the same in order to refill the chamber.

It will be observed that the arrangement of the lubricant passages in the two valve structures described above is such that the devices may be readily and economically manufactured without the necessity of any great amount of machine operations, but that an efficient control of the lubricant pressure is nevertheless provided. The use of a lubricant controlling port 23 which is entirely within the body of the valve element or plug 13 is advantageous in that it permits the actual cut-off of the grease pressure to be performed at a point isolated from the seating surface. More particularly, since port 23 is spaced inwardly from the periphery of washers 25 and 25a, and the peripheries of these washers closely engage the wall of the recess 15, there can be no leakage of pressure or grease from chamber 28 to the seating surface in any position of the plug. Also, since the upper surface of each washer closely contacts with the adjacent end of the plug and its lower surface is closely contacted by nut 17, there can be no leakage at this point.

It will be observed that the larger end of the plug 13 is fully enclosed within the casing 10 and bears upon the resilient washer 25, while the smaller end of the plug projects from the casing. By this arrangement, if the device has not been operated for some time and the plug becomes seized with respect to the casing, it may be freed by a hammer blow on its head 30. That is, the striking of the smaller end of the plug 13 will cause the resilient washer 25 to compress and permit the plug to move axially of its seat. The resiliency of the washer will naturally cause the plug to immediately reseat. In extreme instances nut or closure 17 may be slightly backed out to enable the plug to be moved axially of its seat. It will also be noted that in most instances a tightening of threaded plug 19 will build up entirely sufficient pressure to move the plug 13 in its seat to loosen it for rotation.

Figure 4:
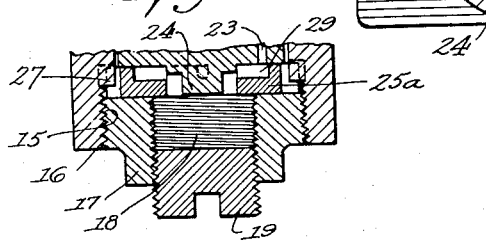
Figure 4 is a fragmentary vertical sectional view of a modified form of valve structure.

Figure 4 shows a modified construction which is identical with that disclosed in Figures 1 to 3 except that the control member or washer 25a of Figure 4 is of metal or other non-resilient material. The structure illustrated in Figure 4 has all of the advantages of the structure of Figures 1 to 3 insofar as the control of the lubricant pressure is concerned. However, the Figure 4 structure involving the use of a rigid or non-resilient control member or washer eliminates the possibility of leakage due to deterioration of a rubber or other resilient washer. Such deterioration may obviously occur when the valve is used to control the flow of certain fluids. Should the plug of the Figure 4 construction become seized, the seizure can be corrected by very slightly backing out the nut or closure 17 and then tapping the head 30 of the plug with a hammer so as to move it axially in its seat. Nut 17 can then be retightened to urge the plug to its proper seated position, preferably after the plug has been very slightly rotated to entirely clear up the seized condition. As is the case with washer 25, washer 25a has a close fit in the valve body element recess 15 so as to entirely isolate chamber 18 from the seating surfaces of the valve structure.

In normal use of the structure of Figure 4 the nut or closure 17 will not be so tightly threaded into the recess 15 as to absolutely lock plug 13 against rotation. That is, the nut will have its inner end just sufficiently, and almost imperceptibly, spaced from washer 25a so that the plug can rotate, all leakage past the plug being sealed by the grease passages 20. However, if the fluid in line passage 20 is under extremely high pressure, nut 17 can be so tightly positioned that the plug will not be rotatable unless the nut or closure is slightly backed out.

It is to be understood that the form of the invention shown and described is merely illustrative of a preferred embodiment and that such changes may be made as fall in the purview of one skilled in the art without departing from the invention and the scope of the claims.

We claim:

1. A plug valve including a casing having a line passage and an inclined valve seat formed transversely of the line passage, a tapered valve plug rotatably mounted in said seat for controlling the flow of the fluid through the line passage, said valve seat having an annular groove adjacent the larger end thereof and spaced longitudinally extending grooves communicating with the annular groove, said casing having an outwardly extending tubular portion into which the large end of said plug extends, said plug having a circumferentially disposed groove communicating with the annular groove in said casing and a port extending from said circumferential groove to the large end of the plug, a washer associated with the large end of the plug, said washer having a central opening and radial slots communicating with said chamber, means for non-rotatably mounting the washer within the tubular portion of the casing, retaining means connected to said tubular portion for maintaining the washer in proper position relative to the plug, said retaining means having a lubricating chamber therein, said port being arranged to be moved into and out of registration with one of said radial slots to control the pressure of lubricant in said grooves, and means for applying pressure to the lubricant in said chamber, said retaining means and washer coacting with the pressure of the lubricant in the chamber to maintain the plug in proper position relative to the valve seat.

2. In a valve structure, a valve body element including a flow passageway and a tapered seat, a tapered plug in the tapered seat, the smaller end of the plug projecting from the valve body element, a chamber in the valve body element surrounding the larger end of the plug and of greater diameter than the latter, a member threaded in said chamber, resilient means interposed between said last-named member and the larger end of the plug, said resilient means being of less thickness axially of the plug than the distance between the inner wall of said chamber and said threaded member when the threaded member, resilient means and plug are in contact and the plug is seated, whereby said resilient member will exert pressure on the plug independently of the valve body element, and means carried by said member to apply pressure to a lubricant within said chamber.

FRANK H. MUELLER.
WALTER J. BOWAN.